Oct. 21, 1958 W. C. RUDD ET AL 2,857,503
SEAM WELDING BY HIGH FREQUENCY RESISTANCE HEATING
Filed Feb. 6, 1957 5 Sheets-Sheet 1
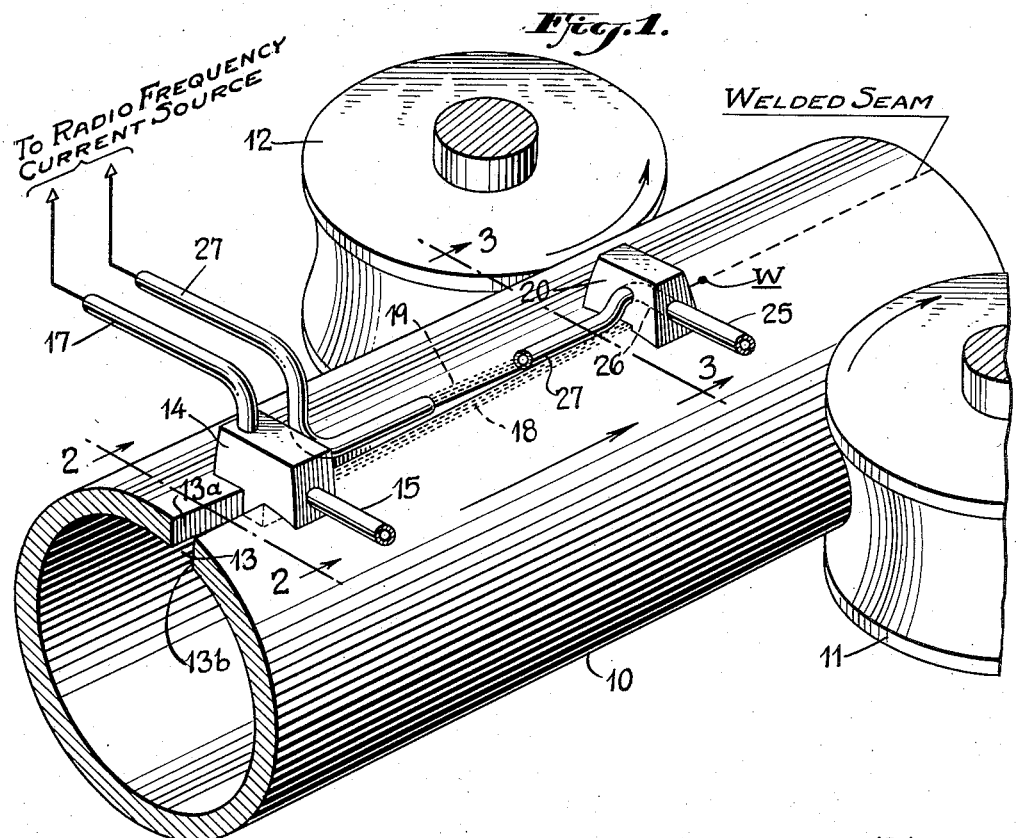
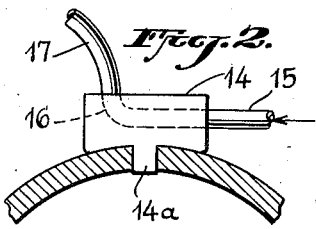
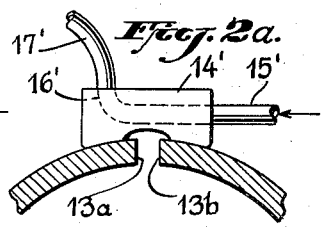
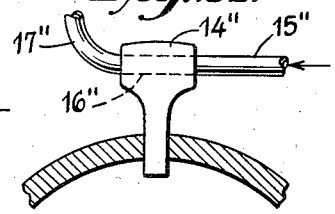
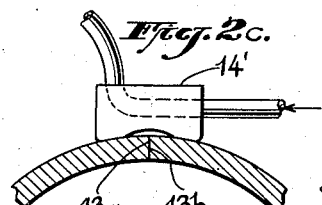
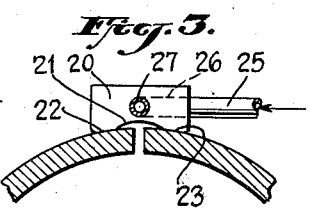
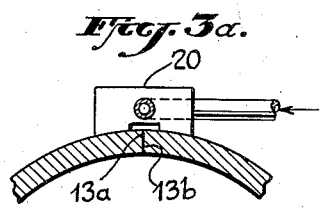
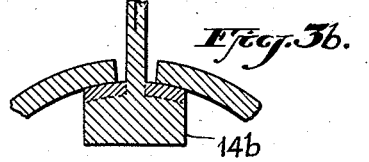
INVENTORS.
WALLACE C. RUDD.
ROBERT J. STANTON.
BY
Ward, Neal, Haselton, Orme & McElhannon
ATTORNEYS.

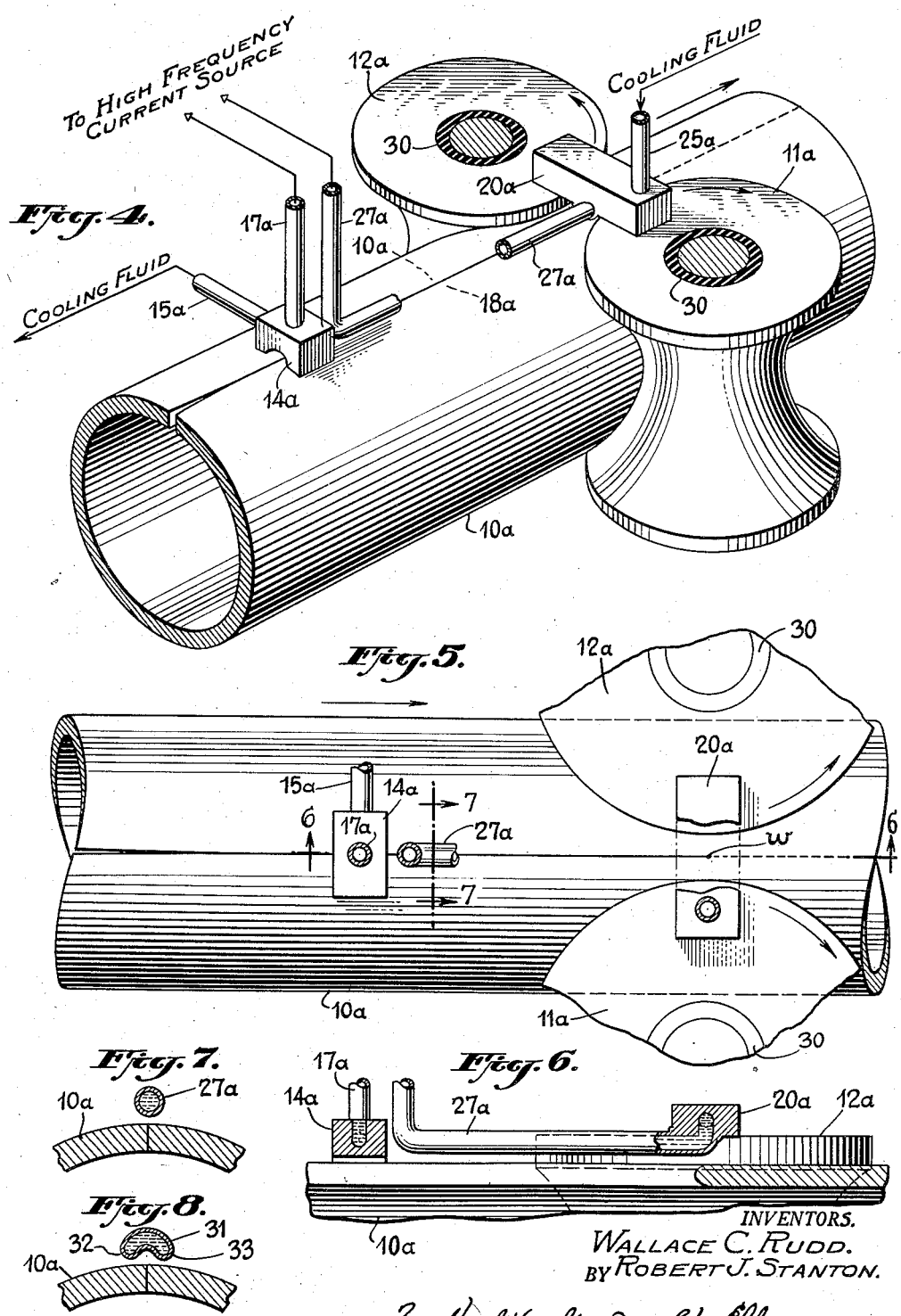

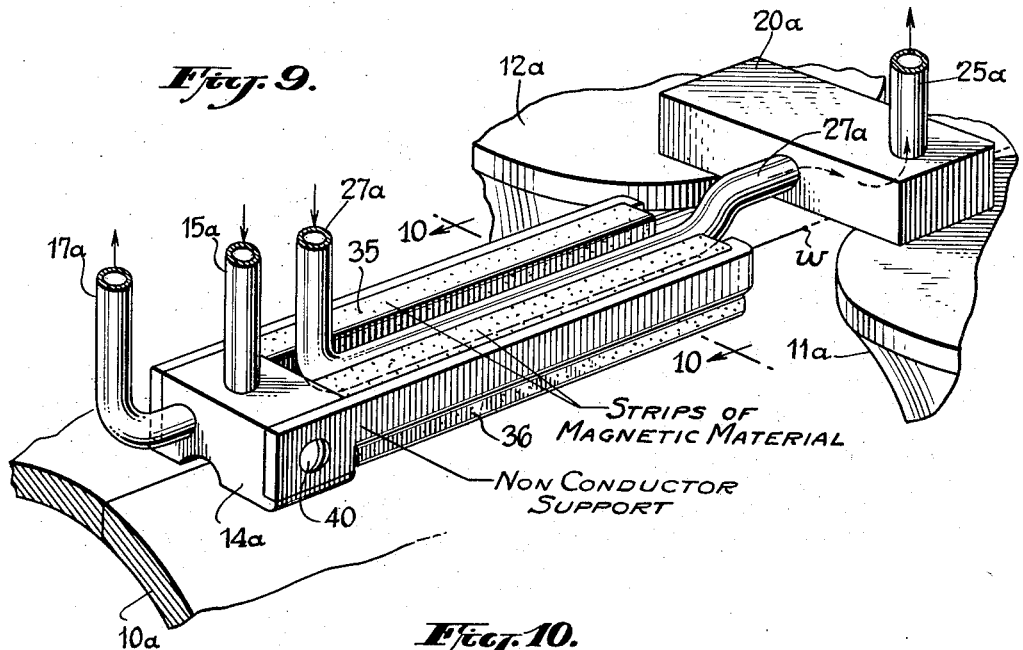
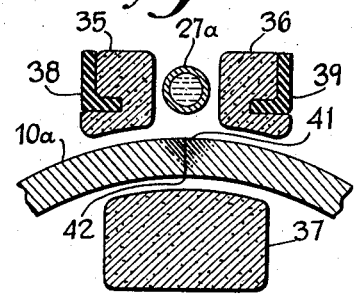
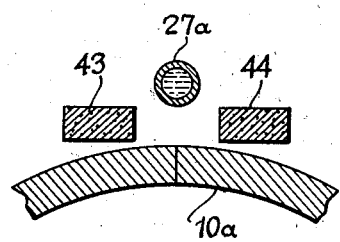

Oct. 21, 1958  W. C. RUDD ET AL  2,857,503
SEAM WELDING BY HIGH FREQUENCY RESISTANCE HEATING
Filed Feb. 6, 1957  5 Sheets-Sheet 4
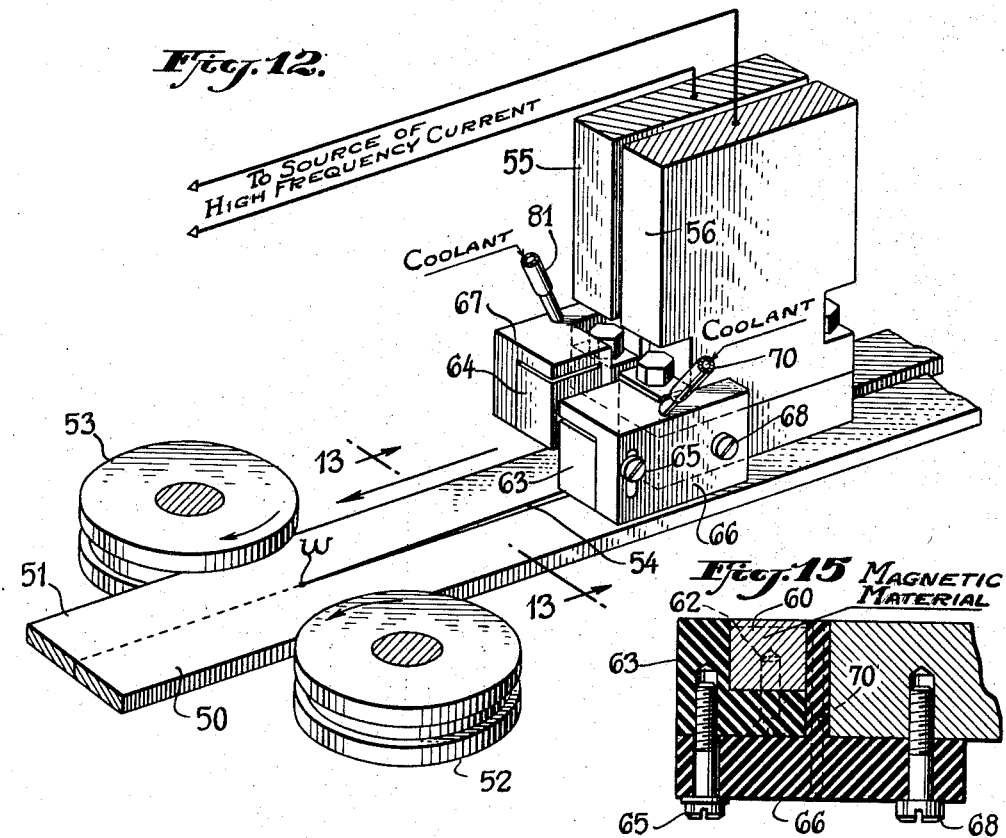
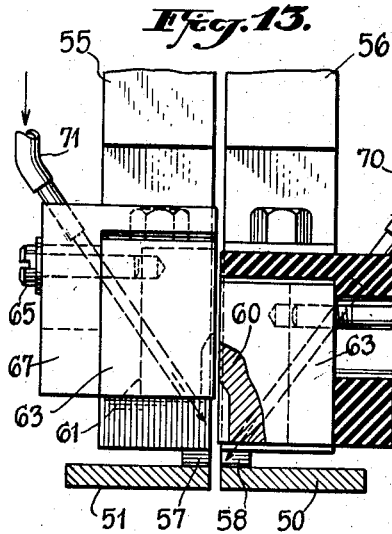
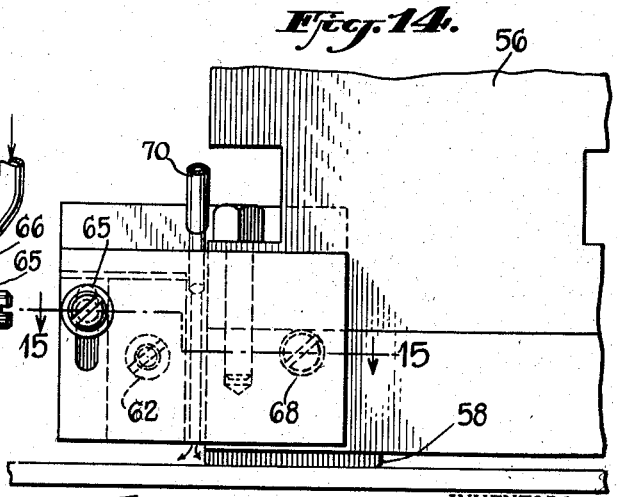
INVENTORS.
WALLACE C. RUDD.
ROBERT J. STANTON.
BY
ATTORNEYS.

Oct. 21, 1958 W. C. RUDD ET AL 2,857,503
SEAM WELDING BY HIGH FREQUENCY RESISTANCE HEATING
Filed Feb. 6, 1957 5 Sheets-Sheet 5
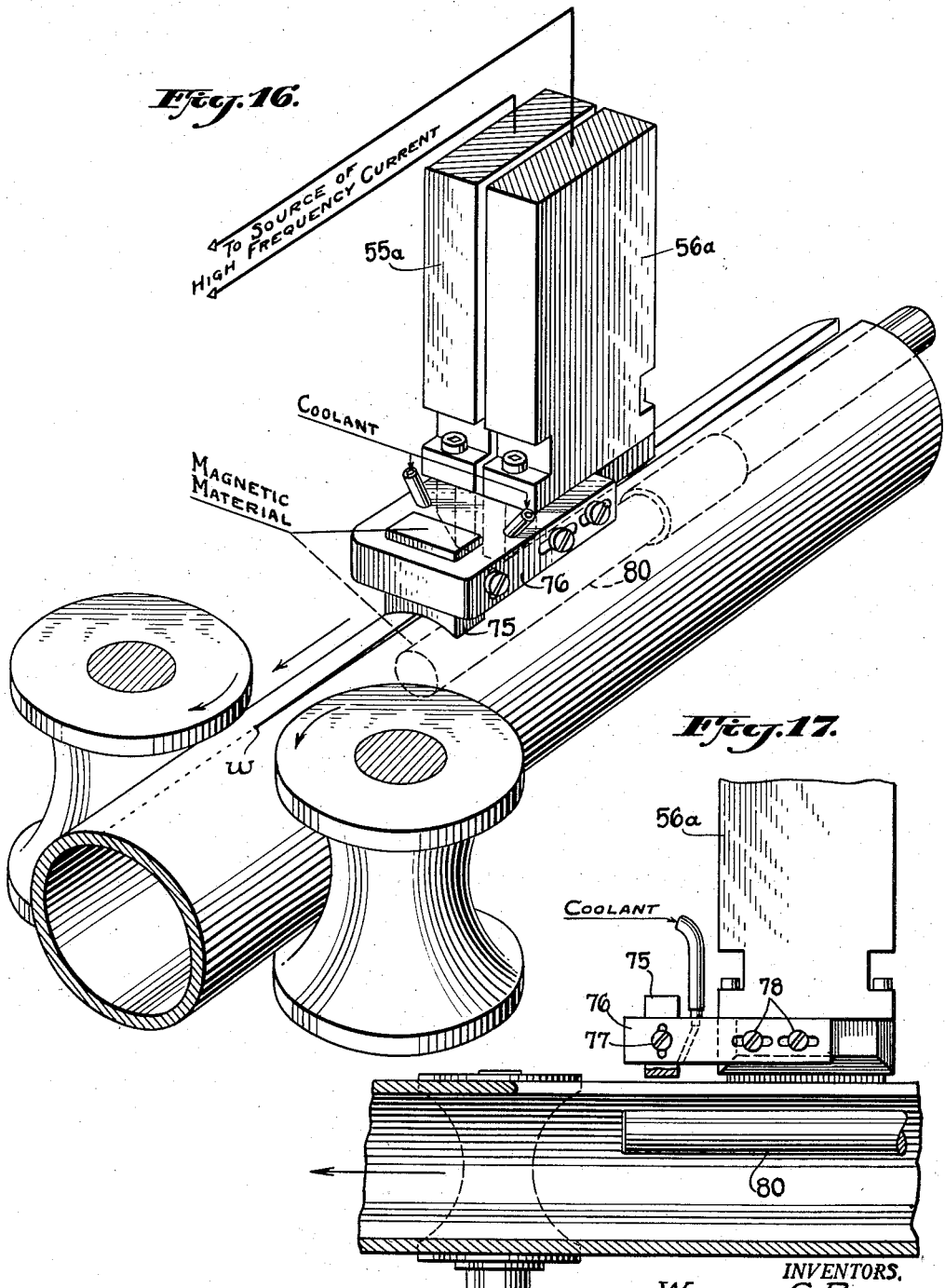
INVENTORS.
WALLACE C. RUDD.
ROBERT J. STANTON.
BY
ATTORNEYS.

United States Patent Office 2,857,503
Patented Oct. 21, 1958

2,857,503

SEAM WELDING BY HIGH FREQUENCY RESISTANCE HEATING

Wallace C. Rudd, Larchmont, and Robert J. Stanton, Brooklyn, N. Y., assignors to Magnetic Heating Corp., New Rochelle, N. Y., a corporation of New York Application February 6, 1957, Serial No. 638,566

15 Claims. (Cl. 219—59)

This invention relates to methods and apparatus adapted for the welding of longitudinal seams in metal tubing or seams along which two metal portions such as strips are welded together.

This invention comprises a continuation-in-part of our co-pending U. S. application Serial No. 448,856, filed August 10, 1954, and entitled "Tube Welding."

Heretofore the preferred commercially used methods for electrically welding seams in metal tubing and other similar seams, have generally involved heating the opposed edges of a longitudinal gap at the seam by induction heating just as the gap is being closed, but such methods have involved considerable difficulty and inefficiency in the transferring of sufficient energy from the heating coils to the metal, particularly in the case of tubing of non-ferrous metal. One such difficulty arises from the fact that a considerable part of such heating currents as are induced in the metal of the tubing tend to flow along lines spaced from the seam, or in the case of tubing, along lines extending circumferentially around the tubing instead of being confined to the seam or gap edges which are to be welded together.

Another method heretofore proposed has involved heating the gap edges by high frequency current conductively applied so that it will flow to and from the weld point along the approaching gap edges to be heated.

The present invention provides highly efficient and improved alternative methods and apparatus for conductively applying heating current at radio frequencies and in such a way that the path or paths of the current will be along the edges which are to be welded together at the seam, and with little or no tendency for the current to stray away from such edges or seam.

According to one aspect of the present invention, a metal tube, the seam of which is to be welded, or the two opposed metal members, portions of which are to be welded together along a seam, are continuously and rapidly advanced past a weld point, and preferably while one terminal of a source of radio frequency current is applied at a point somewhat in advance of the weld point to both of the opposed edges which are to be welded together along the seam. The other terminal of the source of radio frequency current is applied to the metal at or in the region of the weld point and thus the high frequency current travels along parallel lines on the edges of the metal of the desired seam from one of said terminals to the other. And in order to cause the current flow to be closely confined to the edges of the metal along the seam to be welded, either one or the other of the high frequency leads is positioned to extend along in closely spaced relation to the line of the desired seam, such lead preferably extending in close proximity to the line of the seam from the point of first application of the current to a point at or near the weld point. The positioning of the current lead in this way causes the path of the lowest impedance for the current in the metal to be welded, to be confined closely to the line of the seam and yet without interfering with the continuous advance of the metal edges to be welded and further without interfering with the desired firm pressing together of such edges at or adjacent the weld point.

According to a method heretofore proposed for using radio frequency current conductively applied for welding the gap edges in metal tubing, the gap was kept open in advance of the weld point and contacts of opposite polarity were applied to the opposed spaced gap edges in advance of the weld point, whereby the current flow was from the contacts respectively along the spaced gap edges to and from the weld point where the gap was closed. With the present invention, however, the opposed edges to be welded may be either kept apart to provide a gap prior to the weld point or they may be brought together at any point in advance of the point of application of the current. The latter expedient is advantageous under some circumstances in that all the problems concerning irregularities in the width of a gap between the rapidly advancing metal edges may be avoided, and in general possible irregularities due to uneven heating of the opposed edges may be avoided.

According to another embodiment of the present invention, the radio frequency current contact which is applied in the vicinity of the weld point, is applied by way of either one or both of the metal rollers used to press the welded edges firmly together at the weld point on the seam. This makes possible in effect the application of the high frequency without affording any possibility that the contact used at the region of the weld point will have any opportunity to engage hot metal at the seam and cause irregular scarfing or other difficulties, even if the tubing is quite small in diameter.

According to another aspect of the present invention, the radio frequency current is caused to be further concentrated and controlled along the seam edges by the mounting of strips or blocks of suitable magnetic material along such edges in advance of the weld point. One of the difficulties in properly heating the edges to be welded involves the control of the heating current so that the metal will not be overheated or underheated either along the upper or lower portions of such edges. That is, in the case of the welding of tubing, for example, if the outermost surfaces along the seam edges are excessively heated, particularly in case the tubing is of relatively thick metal, then the molten metal will tend to bulge upwardly and form a seam with an irregular outer surface; and if the seam edges on the inside of the tube are excessively heated, then the molten metal may bulge irregularly into the interior of the tubing. Also in case two strips of different metals or alloys are to be welded together, the edge of one may require a different pattern of heating than the opposed edge on the other in order to form a uniform weld. But by the use of blocks or strips of magnetic material in accordance with this invention, these problems may be readily overcome and a uniformly welded seam may be produced at a rapid rate.

Various further and more specific objects, features and advantages of the invention will appear from the description given below, taken in connection with the accompanying drawings illustrating by way of example certain preferred forms of the invention.

In the drawings:

Fig. 1 is a perspective and somewhat schematic view showing one embodiment of the invention;

Fig. 2 is a transverse sectional view taken along line 2—2 of Fig. 1;

Figs. 2a, 2b and 2c are sectional views similar to Fig. 2 but showing certain possible variations of the invention;

Fig. 3 is a transverse sectional view taken substantially along line 3—3 of Fig. 1;

Fig. 3a is a view similar to Fig. 3 but showing an alternative way of practicing the invention;

Fig. 3b is a transverse sectional view similar to that of Fig. 2 but showing an alternative embodiment of the invention;

Fig. 4 is a view similar to Fig. 1, but showing an alternative embodiment of the invention;

Fig. 5 is a plan view, partly in section, of the embodiment of Fig. 4;

Figs. 6 and 7 respectively are broken sectional views taken substantially along lines 6—6 and 7—7 of Fig. 5 respectively;

Fig. 8 is a sectional view similar to Fig. 7, but showing a somewhat modified construction;

Fig. 9 is a perspective view of a further embodiment;

Fig. 10 is a sectional view taken substantially along line 10—10 of Fig. 9;

Fig. 11 is a view similar to Fig. 10 but showing a somewhat modified construction;

Fig. 12 is a perspective view of another embodiment and illustrating further features of the invention;

Fig. 13 is a view taken substantially along line 13—13 of Fig. 12 and showing certain of the parts in vertical section;

Fig. 14 is a side view of the apparatus of Fig. 13;

Fig. 15 is a sectional view taken substantially along line 15—15 of Fig. 14;

Fig. 16 is a view similar to Fig. 12, but showing a further embodiment of the invention; and Fig. 17 is a side view of the arrangement of Fig. 16.

Referring now to the drawings in further detail, a length of the metal tubing is indicated at 10 as it advances in the direction indicated by the arrow, through a tube mill having conventional pressure rollers as at 11, 12 for pressing the tube edges which are to be welded together into contact at or adjacent the weld point w. That is, in practicing the invention in the manner shown in Fig. 1, the tubing as it advances has previously been shaped in generally tubular form but still has a longitudinal gap 13, the opposed gap edges being indicated at 13a and 13b. However, the pressure rollers, such as at 11 and 12 or some other equivalent means, serve not only to advance the tubing but also to bring such gap edges together at or adjacent a weld point such as indicated at w.

According to the present invention, heating current preferably of a radio frequency is brought from a suitable current source to a contact 14 which, as best shown in Fig. 2, may engage the tube slidably and apply the current thereto not only at the surface of the tubing at each side of the gap but, if desired, this contact may be formed with a depending portion 14a for applying the current to the approaching opposed gap edge surfaces as well. If desired, the portion 14a may perform the functions of a "spreader" within the gap for maintaining the gap of the desired width at this point, at a predetermined or adjustable distance in advance of the weld point where the gap edges are or have been brought together by the pressure rollers.

Alternatively, as shown in Fig. 2a, the contact 14' may slidably engage surfaces of the tubing only at either side of the gap or as shown in Fig. 2b, contact 14" may be shaped to engage only the approaching edge surface within the gap.

In all of the above-described cases usually it will be necessary or at least desirable to cool the contact and this may be done by introducing a stream of water or other cooling fluid through an insulation tube 15 into a cavity 16 through the contact, thence out through a tube 17 which may comprise also one of the current connections, as indicated in Figs. 1 and 2. Similar cooling conduits are indicated in Figs. 2a and 2b.

From the contact 14 (or contacts such as 14', 14") high frequency current follows the paths indicated by dotted lines 18, 19 along the approaching gap edges toward the weld point, the currents along these paths being in parallel until they merge in a second contact 20. Contact 20 as best shown in Fig. 3, is preferably shaped with a wide groove as at 21 on its underside so that its surfaces 22 and 23 will slidably engage the tube at spaced positions at either side of the heated seam or gap, which will have been heated substantially to the fusion point by the time the tube arrives at the position of this contact. Preferably, contact 20 is not so made as to slidably bear against the heated seam but is shaped so as to bridge the seam, as shown in Fig. 3, in order not to disturb or scrape the fused metal. As in the case of contact 14, the contact 20 is also preferably provided with fluid conduits, for example a water inlet connection 25, a cavity 26, and an outlet connection 27. The outlet conduit 27, as shown in Fig. 1, may also comprise one of the connections to the radio frequency current source and as further shown in Figs. 1 and 3, the conduit portion 27 is preferably located so as to extend along the approaching tube gap edges midway of same and closely above same for a considerable distance back towards contact 14, thus providing a return high frequency connection so located as to tend strongly to concentrate the current flows 18, 19 closely along the approaching gap edges thereby causing such edges progressively and rapidly to be heated more and more, all the way from contact 14 to contact 20. At the latter contact, the current paths 18, 19 may diverge somewhat in passing up into contact portions 22 and 23.

The construction and arrangement of the first contact as at 14b as shown in Fig. 3b, is particularly desirable in some cases for use with the arrangement otherwise like that of Fig. 1, or in conjunction with parts as at 20a, 27a as in Fig. 4. In Fig. 3b, it will be noted that the contact 14b is mounted on supporting means which extend down through the tube gap, the contact having two parts respectively which engage the inside surface of the tube metal on opposite sides of the gap. With this form of contact, the support therefor is preferably yieldably urged upwardly somewhat by any suitable means acting in the direction of the vertical arrow shown, so that the contact portions pull up on the tube metal at the opposite sides of the gap, insuring that the gap will remain open and in spaced relation to the contact support. If the tube metal is of substantial thickness and if contacts as previously described above are used, there may be some tendency for the outer portion of the weld to be heated more than the weld line along inside the tube, that is to say, the current may not penetrate as far as desired to heat the full depth of the metal at the gap. However, with the arrangement shown in Fig. 3b, this tendency or difficulty is avoided in that the current will be applied to the inner surface of the tube metal at the gap edges and tend to flow along the gap edges and more or less upwardly thereover as they approach the other contact, such as at 20. Thus the entire edges will be heated adequately to their full depth, even though the tube metal may be relatively thick. The arrangement of Fig. 3b has the further advantage that a heavy block of metal may be used to form the contact 14b, and it will be continuously raised somewhat as it wears, by the upward yielding force above mentioned and still maintain uniform contact. Also, such a contact on the inside of the tube will cause no scratches or undesirable marking on the outside of the tube and if used in conjunction with a contact as at 20a in Fig. 4, there will be no marking produced on the tube at all.

While the weld point w has been indicated for clearness at a position just beyond contact 20, yet, if desired, contact 20 may be positioned to bridge the weld point or may be even located somewhat beyond the weld point.

As above indicated, the current used is preferably of radio frequency and with the vacuum tube type, high frequency generators available, such frequency may be, for example, in the neighborhood of 100,000 cycles per second or up to 300,000 or 400,000 cyles or higher. With all such frequencies, the slidable forms of contacts which are preferably used (although not necessarily, in the place of roller contacts) will cause, as has been found, no arcing or sputtering difficulties and same are capable of conducting such high frequency currents into the tube metal with very little resistance loss, even though the tube surfaces may not always be smooth or regular. No arcing or sputtering will take place at the weld point, since the current from the two paths 18 and 19 are in parallel. Thus the uniformity of the weld is assured.

While with the above-described embodiments of the invention, the tube is shown advancing through the tube mill with the gap open as it approaches the apparatus of Fig. 1, the invention, if desired, may also be practiced in a manner such that the tube approaches such apparatus with its gap in closed condition. For example, as shown in Fig. 2c, as the gap edges 13a and 13b approach the contact 14' they have already been brought together, and as shown in Fig. 3a, they are kept together until they come to the weld point at or adjacent contact 20, the practice of this method being otherwise substantially the same as occurs with Fig. 1 when a contact such as at 14' of Fig. 2a is used. This closed gap method is particularly advantageous for reasons above explained and also where relatively short tube lengths are to be welded, in that the weld can be carried substantially to the very ends of the lengths of tubing.

With the method as per Figs. 2c and 3a, the contacts 14' and 20 may be brought relatively close together particularly if a strong current source is provided and if the available space for the apparatus or the length of the tube is limited.

With all of the above-described embodiments of the invention, since direct close parallel paths 18, 19 for the high frequency current are provided between the two contacts 14 and 20, there will be no substantial tendency for the current to stray around elsewhere or to the backside of the tube, and particularly with the return connection 27 located closely along the seam or gap, the great majority of the current will be concentrated therealong. Furthermore, since the current follows a path along intake connection 17, contact 14, paths 18, 19, and contact 20, all of which are close to the return connection 27, the reactance of the circuit may be kept very low, making it possible efficiently to provide a heavy heating current concentrated along the seam to be welded, by the use of a high frequency generator of moderate size. With a generator of given size, the speed with which the tubing may be advanced through the tube mill while being welded is considerably greater than possible with most tube welding apparatus heretofore commercially used. With all forms of the invention above described, it will be understood that the contacts, such as 14 and 20, are preferably mounted on suitable insulation supports, which for clearness are not shown and preferably they are made adjustable longitudinally of the tube path so that the tube gap edges will be adequately heated with the current sources available, before they arrive at the weld point and also so that the contact 20 may be positioned in advance of the weld point or directly over that point or subsequent thereto. In some cases, the latter expedient may be preferred to insure heating of the gap edges more and more up to a maximum as they touch and become welded. On the other hand, in some cases it may be preferable to place the contact 20 somewhat in advance of the weld point, thereby shunting the heating current away from the weld point just before it is reached.

With the method form of the invention as shown in Figs. 4-7 inclusive, certain of the parts corresponding to those in Fig. 1 are identified by the same numerals accompanied by the letter a. Here the gap in the tube 10a is shown as closed prior to its arrival at the contact 14a similarly as in the case of Fig. 2c. Furthermore, in this embodiment, while the electrode or contact 14a may be like the corresponding contacts above described as to construction and mounting, the contact 20a is so mounted that it will engage the top end surfaces of one or both of the rollers 11a and 12a which apply the pressure for firmly holding closed the gap edges at the weld point. As a result, the current paths from contact 14a will follow along parallel lines close to the line of the seam as indicated at 18a and 19a, viz. along beneath the lead 27a until the general region of the weld point is reached between the pressure rollers, whereupon the current will diverge and pass through the pressure rollers up into the contact 20a and to lead 27a. The rollers 11a and 12a in this case should be insulated from their supports as by insulation sleeves 30. This embodiment of the invention is particularly desirable for use in cases where the contact such as at 20a should preferably not directly touch the hot metal of the tube in the vicinity of the weld point. This arrangement is also particularly advantageous in cases where the tubing is quite small in diameter or in cases where it is desired to use the equipment for tubes of various different small cross-sectional sizes without incurring the trouble of adjusting the position of the electrode 20a especially to meet the circumstances of each case, while avoiding any danger of having the electrodes scrape against the hot metal of the tubing. Since by reason of the presence of the lead connection 27a the current beneath same will be closely concentrated along the line of the seam for a considerable distance beyond the contact 14a, the edges to be welded will be adequately heated even though the current just in advance of the weld point diverges therefrom and passes into the pressure rollers.

As indicated in Fig. 8, the cross-sectional shape of the fluid-cooled lead conductor portion which passes along above the seam, may, if desired, be non-circular as indicated at 31. That is, the cross-sectional shape of this conductor may be varied so as to bring side portions as at 32, 33, for example, closer to the surface of the tube metal than the mid-portion and thereby cause variations in the pattern of the heat along the seam. For example, such irregular cross-sections may be used to insure adequate heat along the line of the seam without overheating at the very edges, in the case for example of very thin metal tubing.

The arrangement shown in Figs. 9 and 10 is like that of Figs. 4-7, except that here strips of magnetic material, for example as at 35 and 36, may be arranged alongside the conductor lead portion 27a, and also if desired, another strip as shown at 37 may be suitably mounted internally of the tube along beneath the line of the seam. Such strips of magnetic material may be formed of sintered magnetic oxide, an insulation material, preferably of types now well known per se and which will have a low loss factor and high volume resistivity for example, such as the material marketed under the name Ferramic by General Ceramic & Steatite Corp. It will be understood that other magnetic core means may be used, preferably such that it will have a permeability (mu) greater than 1 (preferably substantially greater) and preferably the magnetic particles being in divided form such that any current losses therein will be minimized. For example, finely divided iron carbonyl mixed with a suitable synthetic resinous insulating material may be used.

As shown in Figs. 9 and 10, the magnetic strips 35 and 36 respectively may be supported upon insulating angle strips as at 38, 39, detachably secured as by screws 40 for example to the electrode 14a. The magnetic rod or strip 37 within the tubing, may be supported in any suitable manner as by a bracket (not shown) located in advance of the contact 14a and extending up through a gap in the tubing. With the arrangement of the strips of magnetic material as in Fig. 10, the maximum heating effect at the seam will tend to occur at the cross-hatched regions indicated at 41, insuring that the inside surface portions at or adjacent the seam as at 42 will be heated to a somewhat lesser degree, thus making it possible to avoid any danger of bulging of the metal into the space within the tube in cases where it is important that the seam areas be smooth on the inside of the tube.

In cases where it is desired to heat the region of the seam both externally and internally of the tube with a greater degree of uniformity, strips of magnetic material may be arranged as shown in Fig. 11 at 43 and 44.

In general, the bringing of the magnetic elements closer to the paths along which the high frequency current is flowing, causes an increase in the reactance of such current paths, thereby tending to cause the current paths to shift further from the magnetic elements, for example toward the seam and toward the lower side of the seam with the parts as in Fig. 11, whereas in the absence of the magnetic elements, the current paths would tend more to be along the upper side of the seam and somewhat more distributed to either side of the seam.

So many factors are involved in determining whether the heating effect will tend to occur more along the outside of the seam than at points closer to or at the inside of the seam, that it is preferable to determine by trial just where the strips of magnetic material may best be located and how far they may best be spaced from the conductor 27a and from the tube metal in order to control a desired heat pattern within the seam.

It will be understood that apparatus like or similar to each of the above-described embodiments of the invention may be used in order to weld not only a seam in tubing, but also to weld a seam between opposed edges in other metal portions, such as strips and the like, it being only necessary appropriately to alter the shape of the pressure applying rollers and the like, as will be apparent from Fig. 12, in order to accommodate moving strips, for example, instead of a tube. In case the strips are of different metals or of alloys for example having different properties when heated, then to secure an appropriate heat pattern in the seam to be weld, one of the strips of magnetic material may be adjusted at one side of the seam with the spacing from the metal more or less than the spacing of the strip of magnetic material on the other side of the seam, or one of the strips may be omitted entirely, in order to assure the desired degree of heating in the respective edges of each strip. As disclosed in the application of the applicant, Wallace C. Rudd, Serial No. 551,566, filed December 7, 1955, the relative spacing of the contacts with respect to the weld point may be varied in the welding together of strips where the strips have dimensions or compositions such that the capability of one strip to distribute the heat applied thereto is substantially different from the capability of the other strip or member to distribute heat applied to points along the desired seam to other portions. In this way opposed points of welding on the two members when they reach the weld point may be heated approximately to the welding temperature appropriate for each member or strip. The above-described expedient of using bodies of magnetic but insulated material may be used as an alternative for the contact adjustment method of said co-pending application.

Furthermore, one or more of such strips may be made of a non-magnetic material of good conductivity, such as copper. Contrary to what might be assumed from superficial consideration of the matter, if such strips or blocks are made of good conductive metal such as copper, they will produce an effect which is substantially opposite to the effect produced when magnetic material is used. That is, by bringing, for example, a block of copper close to the path of the high frequency current, the impedance of such path will become reduced so that the current will then tend to flow closer to such isolated block or strip of copper. Thus, for example, in the case of the member 37 in Fig. 10, this might be formed of copper and thereby having the effect of tending to cause the current to follow a path closer to the lower side of the seam 42.

To meet the various requirements of different circumstances, the mountings for such strips should preferably be made adjustable, one embodiment of such an adjustable arrangement being shown in Figs. 12-14 inclusive. In the particular examples as shown in these latter figures, strips as at 50 and 51 are being welded together at a weld point w while advancing and being pressed together by appropriately shaped rollers 52 and 53. Also, as here shown, in advance of the weld point, the strips are separated by a gap 54. However, it will be understood that so far as concerns the adjustable elements of magnetic material about to be described, same could be used as well with a closed gap and as per the circuit arrangements of Figs. 1 and 4, either with an advancing length of tubing or between a pair of strips to be welded together.

Also, by way of example, the high frequency circuit path of the particular embodiment as shown in Figs. 12-14, is between a pair of electrode supports as at 55, 56, which carry contact shoes 57 and 58 respectively, engaging opposite sides of the gap 54, so that the current flows from such contact shoes along the gap edges to and from the weld point w. Such a circuit path is disclosed in our co-pending U. S. application Serial No. 421,768, filed April 8, 1954 (and in our preceding U. S. application Serial No. 332,422, filed January 21, 1953, and now abandoned, the subject matter of such applications being also disclosed in Belgian Patent No. 530,877, granted August 31, 1954). However, the arrangement providing for a circuit path as of Fig. 1 might also be used with the adjustable magnetic elements now to be described in connection with Figs. 12-14.

As shown in these latter figures, the elements of magnetic material may comprise blocks or the like of finely divided ferromagnetic material embodied in or comprising insulation material as above described and here indicated as at 60 and 61. These may be retained as by set screws 62 (see Fig. 15) in insulating holding elements as at 63, 64. These holding elements in turn may be retained in vertically adjustable positions as by screws 65 passing through vertical slots or apertures in insulating members as at 66, 67, which in turn are secured as by screws 68 to the sides of the electrode supports for example. Since the elements of magnetic material will tend to become overheated in the presence of the high frequency magnetic field, means for cooling same are provided, for example in the form of jets of cooling fluid introduced as through conduits 70, 71, so arranged that the cooling fluid will be projected into the space above the seam to be welded and just in advance of the magnetic elements 60, 61.

The embodiment of the invention shown in Figs. 16 and 17 is similar to that of Figs. 12 and 14, except that here a single block of the magnetic material as at 75 is arranged to be adjustably supported just above the gap or seam. A U-shaped insulation bracket 76 forming a support therefor is shown with the element 75 supported thereon and the bracket in turn having its ends supported respectively on the electrode supports 55a and 56a, the parts being connected as by screws 77 and 78 which pass through slotted apertures so as to permit a desired degree of either vertical or longitudinal adjusting of the position of the magnetic member 75.

Incidentally, the arrangement as shown in Figs. 16 and 17 is indicated as set up for operating on a length of tubing instead of on strips as indicated in Fig. 12, and with the tube gap open in advance of the weld point, but it will be understood that in either case, these arrangements may be set up for operating on either strips or tubes, and with the gap either open, or closed in the event a circuit arrangement generally as of Fig. 1 is adopted.

In the arrangement as shown in Figs. 16 and 17, an additional rod of magnetic material as indicated at 80 may be mounted within the tubing for a purpose corresponding to the strip of magnetic material indicated at 37 in Fig. 7.

The elements of magnetic material as shown in Figs. 12–17 inclusive may, of course, if desired, be more elongated if desired to extend along the seam to be welded, and similarly as in the case of Figs. 9–11. As will also be apparent from the above discussion and from the various figures, the elements of magnetic material may be more or less "loosely coupled" with the metal of the strips or tubing being welded by utilizing magnetic elements of different widths as well as different lengths or of different masses and by spacing same at different predetermined distances in close relation to the work to secure the degree of effective inductive relationship desired between the magnetic elements and the advancing work piece or pieces.

The use of the adjustable elements or strips of magnetic material in the welding together of strips of different alloys is particularly advantageous where the strips are of different alloys which will have different melting points or different electrical resistances. An illustration of this will be apparent for example from Fig. 13 where, if the strip 50 is of high speed steel, for example, and the strip 51 is of high carbon steel, then the element of magnetic material 60 should be adjusted down closer to the strip 50 than is the element 61 with respect to the strip 51, the degree of closeness for best results in each case being determined by trial.

In the appended claims reference is made to the "upper" and "lower" portions of the edges to be welded, but these terms are used relatively, that is to say, to identify the relative positions of the portions intended and as shown in the accompanying drawings, it being understood that the equipment might be mounted in various positions with respect to the flow level, different from that shown.

Although certain particular embodiments of the invention are herein disclosed for purposes of explanation, various further modifications thereof, after study of this specification, will be apparent to those skilled in the art to which the invention pertains. Reference should accordingly be had to the appended claims in determining the scope of the invention.

What is claimed and desired to be secured by Letters Patent is:

1. Method for welding a seam extending along opposed edges of two elongated metal portions, which comprises: advancing said portions with their said edges passing along the line of the desired seam and past a weld point; firmly retaining said edges together as they reach the region of such weld point; maintaining on said edges over a distance substantially in advance of said weld point, flows of electrical current of a frequency of the order to 100,000 cycles per second or higher for progressively heating such edges up to welding temperature at least by the time same reach said point; and controlling the relative degree of heating caused by said current along the upper portions of said edges as compared with the degree of heating along the lower portions thereof, by maintaining adjacent such edges in close predetermined spaced relation thereto, a body or bodies of magnetic but substantially insulating material having a low loss factor, high volume resistivity and magnetic permeability substantially greater than unity, thereby relatively increasing the reactance of the current paths in the edge portions which pass in most effective inductive relation to said material as compared with the reactance of edge portions which pass in less effective inductive relation to such material.

2. Method for welding a seam extending along opposed edges of two elongated metal portions, which comprises: advancing said portions with their said edges passing along the line of the desired seam and past a weld point; firmly retaining said edges together as they reach the region of such weld point; maintaining on said edges over a distance substantially in advance of said weld point, flows of electrical current of a frequency of the order of 100,000 cycles per second or higher for progressively heating such edges up to welding temperature at least by the time same reach said point; and controlling the relative degree of heating caused by said current in one of said edges as compared with the heating in the other, by maintaining adjacent such edges in close predetermined spaced relation thereto, a body or bodies of magnetic but substantially insulating material having a low loss factor, high volume resistivity and magnetic permeability substantially greater than unity, thereby relatively increasing the reactance of the current paths in the edge portions which pass in most effective inductive relation to said material as compared with the reactance of edge portions which pass in less effective inductive relation to such material.

3. Method for welding a seam extending along opposed edges of two elongated metal portions, which comprises: advancing said portions with their said edges passing along the line of the desired seam and past a weld point; firmly retaining said edges together as they reach the region of such weld point; applying to said edges at a location substantially in advance of said weld point one terminal of a source of electrical current of a frequency of the order of 100,000 cycles per second or higher; applying the other terminal of said source to said metal portions adjacent the region of said weld point, whereby parallel flows of said current will be maintained on said edges along the line of the desired seam for progressively heating such edges up to welding temperature at least by the time same reach said point; maintaining a conductor carrying said current in a position extending along in spaced relation to and above said line thereby to cause said parallel flows of current to be concentrated along said edges; and further increasing and controlling the degree of such concentration by maintaining along adjacent said edges in close predetermined spaced relation thereto, a strip or strips of magnetic but substantially insulating material having a low loss factor, high volume resistivity and magnetic permeability substantially greater than unity.

4. Method for welding together the edges of two strip-like members formed of metal of different types which comprises: advancing such strips with their edges facing along the desired line of the weld and past a weld point; maintaining on said edges over a distance substantially in advance of said weld point, flows of electrical current of a frequency of the order of 100,000 cycles per second or higher for progressively heating same up to welding temperature at least by the time same reach said point; and controlling the relative degree of heating caused by said current in the edge of one of said strips as compared with the heating in the edge of the other by maintaining along adjacent the edges of said one of the strips but in spaced relation thereto, a body of magnetic but substantially insulating material having a low loss factor, high volume resistivity and magnetic permeability substantially greater than unity, such body acting to increase the reactance to said high frequency current along the path for such current which extends along adjacent said body.

5. Method for welding a seam extending along opposed edges of two elongated metal portions, which comprises: advancing said portions with their said edges passing along the line of the desired seam and past a weld point; applying opposed pressure rollers to said metal portions whereby said edges are retained together under pressure as they pass the region of said weld point; applying to said edges at a location substantially in advance of said weld point one terminal of a source of electrical current of a frequency of 100,000 cycles per second or higher; applying the other terminal of such source to said rollers whereby flows of such current will be maintained along said edges as they advance for progressively heating same up to welding temperature at least by the time same reach said point; and maintaining a conductor carrying said current in a position extending along in closely spaced relation to and above said edges, thereby to cause the current flowing in said metal portions to be concentrated along said edges.

6. Method for welding a seam extending along opposed edges of two elongated metal portions which comprises: advancing said portions with their said edges passing along the line of the desired seam and past a weld point; applying opposed pressure rollers to said metal portions whereby said edges are retained together under pressure as they pass the region of said weld point; applying to said edges at a location substantially in advance of said weld point one terminal of a source of electrical current of a frequency of 100,000 cycles per second or higher; applying the other terminal of such source to said rollers whereby flows of such current will be maintained along said edges as they advance for progressively heating same up to welding temperature at least by the time same reach said point; maintaining a conductor carrying said current in a position extending along in closely spaced relation to and above said edges, thereby to cause the current flowing in said metal portions to be concentrated along said edges; and further controlling distribution of the current flowing on said edges by maintaining along in spaced relation to said conductor and to said edges a magnetic but substantially insulating material having a low loss factor, high volume resistivity and magnetic permeability substantially greater than unity.

7. Apparatus for welding a seam along opposed edges of two elongated metal portions, which comprises: means for advancing said portions with their edges passing along the line of the desired seam and past a weld point; a source of electrical current of a frequency of the order of 100,000 cycles per second or higher; electrode means for applying said current to flow along on said edges for a substantial distance in advance of the weld point for progressively heating such edges up to welding temperature at least by the time same reach said point; means for controlling the degree of concentration of the current along on predetermined portions of said edges comprising an element embodying a magnetic but substantially insulating material having a low loss factor, high volume resistivity and magnetic permeability substantially greater than unity; and means for mounting said element in a predetermined spaced relation to said edges in which the current is flowing and acting to increase the high frequency reactance of current paths spaced from the line of the desired seam.

8. Apparatus for welding a seam along opposed edges of two elongated metal portions, which comprises: means for advancing said portions with their edges passing along the line of the desired seam and past a weld point; a source of electrical current of a frequency of the order of 100,000 cycles per second or higher; electrode means for applying said current to flow along on said edges for a substantial distance in advance of the weld point for progressively heating such edges up to welding temperature at least by the time same reach said point; means for controlling the relative degree of heating caused by said current in one of said edges as compared with the heating in the other, comprising two ferromagnetic elements of substantially insulating material; and means for adjustably mounting said elements respectively in variably spaced positions with respect to said edges.

9. Apparatus for welding a seam along opposed edges of two elongated metal portions, which comprises in combination: means for rapidly advancing said portions with their said edges passing along the line of the desired seam and converging under pressure into contact substantially at a weld point, the advancing edges being spaced apart in a narrow V-shaped formation in advance of said point; a source of electrical current of a frequency of the order of 100,000 cycles per second or higher; first contact means at or adjacent the weld point for applying current from one terminal of such source to said metal portions; second contact means engaging said metal portions substantially in advance of said weld point and connected to the other terminal of said source, said contact means and said metal portions acting to complete a circuit with said current source, which circuit includes parallel current paths along on the edges of said metal portions respectively and extending between the two contact means for progressively heating said edges up to welding temperature substantially as same reach said point; means for mounting said first contact means to engage the upper surface of said metal portion; and means for mounting said second contact means to engage the under surfaces of said metal portions at or adjacent said edges, whereby the current in flowing between said contact means will follow paths on said edges extending from the lower portions of said edges at the second contact means and up to the upper portions of said edges at regions nearer the weld point.

10. Apparatus for welding together the edges adjacent a longitudinal gap in metal tubing, such apparatus comprising in combination: means for longitudinally advancing the tubing and for applying pressure thereto to close said gap at or adjacent a weld point; a source of electrical current of a frequency of the order of 100,000 cycles per second or higher; first contact means at or adjacent the weld point for applying current from one terminal of said source to the tubing; second contact means engaging the tubing substantially in advance of said weld point and connected to the other terminal of said source, said contact means and the tubing acting to complete a circuit with said current source, which circuit includes parallel current paths along on the edges of said gap respectively and extending between the two contact means for progressively heating the edges up to welding temperature substantially as same reach said point; means for mounting said first contact means to engage the outer surface of the tubing; means extending down through said gap for mounting said second contact means to engage the inside surfaces of the tubing at or adjacent said edges, whereby the current in flowing between said contact means will follow paths on said edges extending from the inner portions of said edges at the second contact means and up to the outer portions of said edges at regions nearer the weld point; and means for yieldably applying upward pressure against the mounting means for said second contact means whereby said second contact means will press against the inner surface of the tubing at said gap.

11. Apparatus for welding a seam along opposed edges of two elongated metal portions which comprises in combination: means for advancing said portions with their edges passing along the line of the desired seam and past a weld point; a source of electrical current of a frequency of the order of 100,000 cycles per second or higher; first contact means at or adjacent the weld point for applying current from one terminal of such source to said metal portions; second contact means engaging said metal portions substantially in advance of said weld point and connected to the other terminal of said source, the connections from said source to at least one of said contact means including a high frequency conductor portion extending along above and in closely spaced relation to the line of the desired seam in advance of the weld point, said contact means, said conductor portion and said metal portions acting to complete a circuit with said current source, which circuit includes parallel current paths along on the edges of the metal portions respectively and extending between two contact means for progressively heating said edges up to welding temperature at or prior to reaching the weld point; the high frequency current in said conductor portion acting to concentrate the current at said edges by decreasing the reactance of the current paths thereon as compared with paths spaced from said edges; and additional means for concentrating the current at said edges comprising bodies of magnetic but substantially insulating material having a low loss factor and extending adjacent the line of the desired seam but in predetermined spaced relation thereto and spaced at opposite sides thereof respectively, and acting further to increase the reactance of the current paths spaced from said edges as compared with the lowered reactance of the paths on said edges.

12. Apparatus for welding a seam along opposed edges of two elongated metal portions which comprises in combination: means for advancing said portions with their edges in contact and passing along the line of the desired seam and past a weld point; a source of electrical current of a frequency of the order of 100,000 cycles per second or higher; first contact means at or adjacent the weld point for applying current from one terminal of such source to said metal portions; second contact means engaging said metal portions substantially in advance of said weld point and connected to the other terminal of said source, said contact means and said metal portions acting to complete a circuit with said current source, which circuit includes parallel current paths along on the contacting edges of the metal portions respectively and extending between two contact means for progressively heating said edges up to welding temperature at or prior to reaching the weld point; and means for concentrating the current closely at said edges comprising bodies of magnetic but substantially insulating material having a low loss factor and extending adjacent the line of the desired seam but in predetermined spaced relation thereto and spaced at opposite sides thereof respectively, thereby increasing the reactance of the current paths spaced from said edges as compared with the reactance of the current paths along at said edges.

13. Apparatus for welding a seam along opposed edges of two elongated metal portions which comprises in combination: means for advancing said portions with their edges passing along the line of the desired seam and past a weld point; a source of electrical current of a frequency of the order of 100,000 cycles per second or higher; first contact means at or adjacent the weld point for applying current from one terminal of such source to said metal portions; second contact means engaging said metal portions substantially in advance of said weld point and connected to the other terminal of said source, the connections from said source to at least one of said contact means including a high frequency conductor portion extending along above and in closely spaced relation to the line of the desired seam in advance of the weld point, said contact means, said conductor portion and said metal portions acting to complete a circuit with said current source, which circuit includes parallel current paths along on the edge of the metal portions respectively and extending between two contact means for progressively heating said edges up to welding temperature at or prior to reaching the weld point, the high frequency current in said conductor portion acting to concentrate the current at said edges by decreasing the reactance of the current paths thereon as compared with the reactance of paths spaced from said edges.

14. Apparatus for welding a seam along opposed edges of two elongated metal portions which comprises in combination: means for advancing said portions with their edges passing long the line of the desired seam and past a weld point; a source of electrical current of a frequency of the order of 100,000 cycles per second or higher; first contact means at or adjacent the weld point for applying current from one terminal of such source to said metal portions; second contact means engaging said metal portions substantially in advance of said weld point and connected to the other terminal of said source, said contact means and said metal portions acting to complete a circuit with said current source, which circuit includes parallel current paths along on the edges of the metal portions respectively and extending between two contact means for progressively heating said edges up to welding temperature at or prior to reaching the weld point; and means for controlling the concentration of current in said paths comprising a body or bodies of magnetic but substantially insulating material having a low loss factor and extending adjacent the line of the desired seam but in predetermined spaced relation thereto, thereby increasing the reactance of the current paths which pass in most effective inductive relation to said material as compared with the reactance of paths in less effective inductive relation to such material.

15. Apparatus for welding a seam along opposed edges of two elongated metal members of types having different properties when heated, which comprises: means for advancing said members with their said edges passing along the desired seam and past a weld point; a source of electrical current of a frequency of the order of 100,000 cycles per second or higher; contact means for applying said current to flow along on said edges for a substantial distance in advance of the weld point for progressively heating such edges up to welding temperature at least by the time same reach said point; and means for controlling the concentration of current along said edges and consequently causing application of different amounts of heat to the surfaces of said edges respectively, comprising a body or bodies of magnetic but substantially insulating material having a low loss factor and extending adjacent the line of the desired seam, but in predetermined spaced relation thereto, thereby increasing the reactance of the current paths along said edges which pass in most effective inductive relation to said material.

References Cited in the file of this patent

UNITED STATES PATENTS 2,066,668    Bennett _____ Jan. 5, 1937
2,167,554    Sciaky _____ July 25, 1939

UNITED STATES PATENT OFFICE
CERTIFICATE OF CORRECTION

Patent No. 2,857,503                                    October 21, 1958

Wallace C. Rudd et al.

It is hereby certified that error appears in the printed specification of the above numbered patent requiring correction and that the said Letters Patent should read as corrected below.

Column 9, line 61, for "to 100,000 cycles" read -- of 100,000 cycles --; column 14, line 13, for "long" read -- along --.

Signed and sealed this 6th day of January 1959.

(SEAL)
Attest:
KARL H. AXLINE

Attesting Officer

ROBERT C. WATSON
Commissioner of Patents